F. BRIGHTMAN.
TOP FOR MILK CANS.
APPLICATION FILED OCT. 24, 1910.

999,201.

Patented Aug. 1, 1911.

WITNESSES
G. M. Spring
T. E. Barkly

INVENTOR,
Frank Brightman
by Frank A. Ahleman
Attorney

UNITED STATES PATENT OFFICE.

FRANK BRIGHTMAN, OF SHAWANO, WISCONSIN.

TOP FOR MILK-CANS.

999,201.  Specification of Letters Patent.  Patented Aug. 1, 1911.

Application filed October 24, 1910. Serial No. 588,694.

*To all whom it may concern:*

Be it known that I, FRANK BRIGHTMAN, a citizen of the United States of America, and resident of Shawano, in the county of Shawano and State of Wisconsin, have invented certain new and useful Improvements in Tops for Milk-Cans, of which the following is a specification.

This invention relates to shipping and storage vessels and particularly to metallic vessels of the milk can type, the said invention relating more especially to a cover for such a receptacle.

An object of this invention is to provide a cover and an attachment therefor for supporting the said cover free of the mouth of the vessel in order to permit circulation between the mouth and cover. In milk and cream cans it is desirable to permit circulation of air to facilitate cooling of the milk after it is placed in the receptacle and the cover forming the subject matter of this invention effectually protects the contents of the receptacle against the entrance of foreign matter while at the same time affords the circulation heretofore mentioned.

A still further object of this invention is to provide novel means for holding the cover in place through the medium of devices adapted to engage the handles of an ordinary can, thus simplifying the construction and minimizing the parts necessary to accomplish the result.

With the foregoing and other objects in view, the invention consists in the details of construction and in the arrangement and combination of parts to be hereinafter more fully set forth and claimed.

In describing the invention in detail, reference will be had to the accompanying drawings forming part of this specification wherein like characters denote corresponding parts in the several views, and in which—

Figure 1:
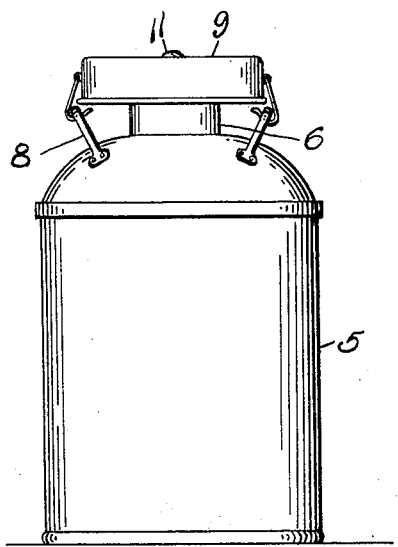
Figure 2:
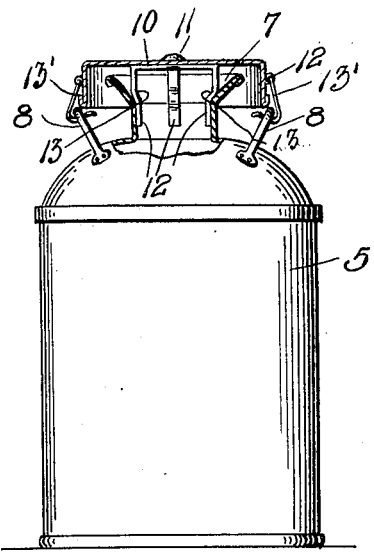
Figure 3:
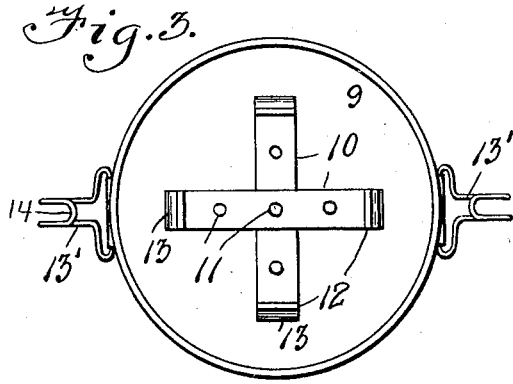
Figure 4:
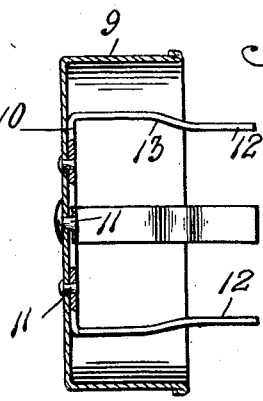

Figure 1 illustrates a view in elevation of a can with the cover applied thereto; Fig. 2 illustrates a similar view with the neck or mouth of the can and cover in section; Fig. 3 illustrates an underneath plan view of the cover; and Fig. 4 illustrates an enlarged sectional view of the said cover.

In these drawings 5 denotes the can having the usual neck 6 and mouth 7 and the usual handles 8. The cover 9 forming the subject matter of the invention is of dish-shaped construction inverted so that its walls extend below the mouth of the receptacle and the cover portion proper extends across the mouth of the receptacle. It is the purpose of the invention to suspend or support the cover clear of the mouth of the receptacle in order to leave an intervening space between the cover and mouth for the circulation of air and to that end, the under surface of the cover is provided with a spider 10 secured thereto by the rivet or fastening 11. The supporting member has downwardly extending legs 12 which are offset to form shoulders 13 which shoulders rest on the surface of the mouth of the can and limit the downward movement of the said cover. The legs are slightly resilient in order that they may be readily applied to the mouth of the receptacle by sliding down the inclined surface thereof, although it will be possible to make the said legs rigid provided they are suitably spaced and fit within the mouth of the receptacle in the manner shown in Fig. 2.

A cover such as described can be used in connection with five, eight or ten gallon cans and with cans of ordinary sizes for owing to the shape of the spider legs they can be adjusted for purposes required.

As a means for fastening the cover in place, I provide the said cover with eyelets 12 and have the shanks 13' of the spring hooks or latches pivoted thereto, the hooked ends 14 thereof being in engagement with the handles 8 of the receptacle. When the cover is applied to the can or receptacle in the manner shown in Fig. 2, movement of the said cover is prevented except under proper manipulation of the latches and it has been found in practice that a receptacle so fitted may be immersed in water when the can is in an upright position and the air compressed in the top of the cover forms a seal to prevent the water from gaining access to the can. The user of a receptacle of this kind can, therefore, immerse the can in a cooling agent such as a barrel filled with water without liability of contaminating the contents of the receptacle or he may allow the same to stand with the mouth of the receptacle out of the water to permit the circulation of air which circulation is necessary to effect a speedy cooling of the contents.

I claim

1. The combination with a can having a flared opening, and a plurality of handle members secured to the top of the can, a cover having a downwardly projecting flange, a plurality of downwardly projecting resilient members distorted to form an angular shoulder intermediate their extremities, said downwardly projecting resilient members, adapted to be received within the opening of the can, and means carried by the downwardly projecting annular rim, adapted to engage said handles and secure the cover in position on the can.

2. The combination with a milk can, having a plurality of handles and an angularly flared opening, of a lid having a downwardly projecting annular flange, a plurality of downwardly projecting resilient members secured to the underside of said lid, by angular shoulders between the extremities of said downwardly projecting members, said angular shoulders adapted to conform to, and frictionally engage the angularly flared opening of the can, and means carried by the lid to engage the handles and secure the lid in position on the can.

In testimony whereof, I affix my signature in the presence of two witnesses.

FRANK BRIGHTMAN.

Witnesses:
F. A. EBERLEIN,
M. G. EBERLIN.

Copies of this patent may be obtained for five cents each, by addressing the "Commissioner of Patents, Washington, D. C."